UNITED STATES PATENT OFFICE.

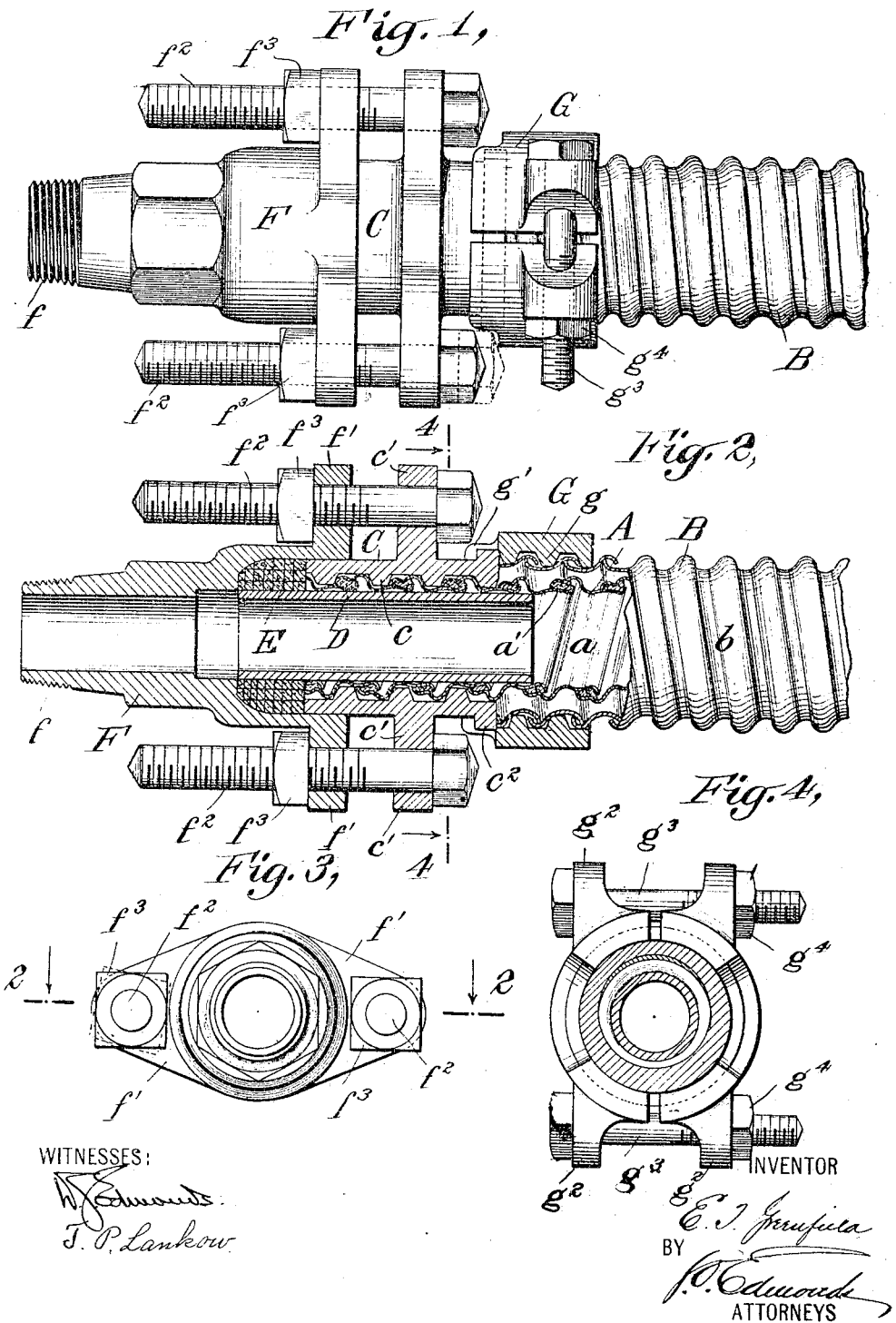

EDWIN T. GREENFIELD, OF KIAMESHA, NEW YORK.

COUPLING.

956,076.

Specification of Letters Patent.   Patented Apr. 26, 1910.

Application filed October 30, 1906. Serial No. 341,254.

*To all whom it may concern:*

Be it known that I, EDWIN T. GREENFIELD, a citizen of the United States, residing at Kiamesha, in the county of Sullivan and State of New York, have invented certain new and useful Improvements in Couplings, of which the following is a specification.

This invention relates to couplings for connecting the end of a length of hose to a hydrant, steam-engine, air-compressor or the like, or to the end of another length of hose.

The object of the invention is to provide a coupling for such uses which possesses the requisite strength, which can be manufactured at small cost, which can be readily applied to the end of a length of hose and by which such a tight connection with the end of a hose is effected as will preclude the escape at the joint of the hose and coupling of the fluid agent passing therethrough even though such agent be under considerable pressure.

Certain features of my invention are applicable to couplings for use with hose of various types as for instance, that known as the "Greenfield armored hose," but the invention is directed particularly to the provison of a coupling for use with hose formed of two concentric tubes each consisting of spirally-formed metallic strips, the inner tube having a gasket associated therewith to prevent leakage of the fluid passing therethrough, and the outer tube being so formed as to limit the relative movement of adjacent spirals thereof so as to limit the extent of flexure of the hose as a whole, since excessive flexure would open seams in the inner tube through which the fluid agent would escape.

The preferred embodiment of my invention is illustrated in the accompanying drawings in which—

Figure 1 is an elevation of the coupling, Fig. 2 is a longitudinal section thereof, the line of the section being indicated by the line 2—2 of Fig. 3. Fig. 3 is an end view of the coupling and Fig. 4 is a transverse section on line 4—4 of Fig. 2.

Referring to the drawings, the type of hose for which the coupling is specially adapted is illustrated as formed of two concentric tubes A and B, each consisting of spirally-formed metallic strip. The strip $a$ for the inner tube has an inwardly turned flange at one edge and an outwardly turned flange at the other such that when the strip is formed spirally, the flanges at the edges of adjacent convolutions interlock and a gasket $a'$ is compressed between these interlocking flanges so as to make the tube air-tight. The construction is such that movement of each spiral relatively to the spirals adjacent thereto is permitted, but since excessive movement of this character would open seams through which the fluid agent passing through the hose would escape, means are provided for guarding against such excessive movement by limiting the amount of flexure of the hose. This consists of the outer tube B, also formed from a metallic strip $b$ having inwardly and outwardly turned flanges at the edges which, when the strip is formed spirally, interlock. The configuration of these interlocking flanges is such as to allow only a comparatively small and accurately predetermined amount of relative movement so as to permit the hose to be flexed only to such extent as will not open seams in the inner tube.

The coupling comprises a sleeve C internally threaded to correspond with the pitch of the spirals of the inner tube A so that an internal spiral projection $c$ is provided adapted to enter the peripheral spiral depression in the inner tube. The outer tube B is cut away for a distance back from the end of the hose equal to the length of the sleeve C and the latter is then screwed upon the end of the inner tube until its end engages the end of the outer tube as shown in Fig. 2. An internal sleeve D, which may consist of a short length of iron pipe, is then forced into the end of the inner tube A. The diameter of this internal sleeve D is such that when the sleeve is forced into the sleeve A, it crowds the spirals thereof tightly against the inner walls of the sleeve C. This inner sleeve is of such length that when in position its end extends a short distance beyond the end of the tube A, as shown in Fig. 2. A gasket E is then positioned upon this projecting end of the inner sleeve D, its side wall bearing against the ends of both the tube A and the sleeve C. This gasket preferably consists of a compressible cord wound tightly upon the end of sleeve D and against the ends of the tube A and sleeve C forming an annular compressible gasket as shown in Fig. 2.

F indicates a socket member consisting of a casting having an axial opening therethrough; this socket is inserted over the gasket E and the end of the sleeve C and drawn up tightly to compress the gasket between it and the ends of tube A and sleeve C. The socket is threaded at one end, as indicated at $f$, to facilitate connecting it with a hydrant, steam-pipe or another coupling, and at its other end the axial opening through the socket is enlarged to form a receptacle for the gasket E and the end of sleeve C, the walls of this receptacle being parallel to the axis of the socket so that it will make a tight fit with and slide over the end of sleeve C whose outer walls are also parallel to the axis thereof. Two diametrically-opposed outwardly-extending ears $f'$ with openings therethrough are formed integral with the socket F on the inner end thereof and two similar ears $c'$ with openings therethrough are formed on the sleeve C. When the socket F is in position as shown in Fig. 2, bolts $f^2$ are passed through the openings in the corresponding ears $c'$ and $f'$ and nuts $f^3$ are screwed thereon by turning the bolts until the nuts engage the walls of the ears $f'$. The bolts $f^2$ lie so close to the exterior walls of the socket F that the nuts $f^3$ cannot turn; this relation of the parts is best shown in Fig. 3 in which the nuts $f^3$ are shown in full lines and the dotted lines indicate the maximum amount of movement of the nuts upon the bolts permitted by the walls of the socket. It is therefore only necessary to apply a wrench to the headed ends of the bolts $f^2$ to tighten up the bolts and thus draw the socket F up upon the C until the gasket E is tightly compressed against the ends of the tube A and sleeve C. In this way a firm union is effected between the end of the inner tube A and the coupling, and escape of the fluid agent passing through the coupling and tube at the joint between them is effectually prevented.

On the inner end of the sleeve C is formed an integral peripheral flange $c^2$. In order to secure the outer tube B to the coupling, I provide a two-part sleeve G adapted to grip the tube B and to coact with the flange $c^2$ on sleeve C. The two parts of this sleeve are interiorly threaded to correspond with the pitch of the outer tube B and provide an internal spiral projection $g$ adapted to enter the peripheral spiral depression in the tube B. The parts of this sleeve also have at one side thereof an inwardly extending flange $g'$. Formed on each of the two parts of the sleeve G at the ends thereof are outwardly-extending integral ears $g^2$, having openings therethrough. The two parts of the sleeve G thus formed, are positioned upon the tube B, the end of which lies against the end of the sleeve C, with the internal thread $g$ entering the depression in the tube and the flange $g'$ overlying the flange $c^2$ on the sleeve C. When in this position bolts $g^3$ are inserted through the openings in corresponding ears $g^2$ on the two parts of sleeve G and nuts $g^4$ are tightened up upon the ends of these bolts to draw the two parts tightly together and thus cause them to firmly grip the tube B and to coact with the flange $c^2$ on the sleeve C to prevent the tube B from being pulled away from sleeve C. When in this position the sleeve B overlies the headed ends of the bolts $f^2$ so that under no conditions can these bolts work loose beyond the extent indicated by the dotted lines in Fig. 1. Both the bolts $f^2$ and the nuts $f^3$ are therefore held against accidental displacement and the parts can only be disassembled by removing the sleeve G.

Having described my invention what I claim as new and desire to secure by Letters Patent of the United States is:

1. The combination of a flexible tubing consisting of a series of metallic, interlocking, relatively movable spirals having a gasket between them, a tube independent of said tubing and inclosing the same consisting of a series of metallic, interlocking, relatively movable spirals, said tube being arranged to limit the flexure of said tubing, a sleeve secured upon the end of said tubing, a second sleeve secured upon the end of said tube and interlocking with said first sleeve, a socket-member, a gasket, and means for securing said socket-member to said first sleeve and compressing said gasket between them, substantially as set forth.

2. The combination of a flexible tubing consisting of a series of metallic, interlocking, relatively movable spirals having a gasket between them, a tube independent of said tubing and inclosing the same consisting of a series of metallic, interlocking, relatively movable spirals, said tube being arranged to limit the flexure of said tubing, a sleeve secured upon the end of said tubing, a second sleeve secured upon the end of said tube and interlocking with said first sleeve, an internal sleeve extending within said tubing and projecting beyond the end of the same, a gasket on said projecting end, a socket-member inclosing said gasket, and means for securing said socket-member to said first sleeve, substantially as set forth.

3. The combination of a tube and a coupling therefor comprising an external sleeve upon said tube, an internal sleeve fitting within the tube and projecting beyond the end of the same, a gasket on said projecting end, a socket having an axial opening therethrough enlarged intermediate of its ends to provide walls adapted to fit over said internal sleeve and further enlarged at one end to provide walls fitting over said external sleeve and inclosing said gasket between the socket and the projecting end of the internal sleeve, and means for drawing said socket up over one end of said external sleeve to compress said gasket between the socket and the ends of said sleeve and tube, substantially as described.

4. The combination of a tube and a coupling therefor comprising an external sleeve upon said tube, an internal sleeve fitting within said tube and projecting beyond the end thereof, a socket having an axial opening therethrough enlarged at one end thereof to provide walls fitting over said external sleeve, a gasket within said enlarged portion and surrounding the projecting end of said internal sleeve, integral ears on said socket and external sleeve having openings therethrough and bolts extending through said openings and adapted to draw said socket and external sleeve together to compress said gasket between said socket and the end of said tube, substantially as described.

5. The combination of a hose consisting of two concentric tubes, interlocked sleeves secured one on each of said tubes, a socket, a gasket between said socket and one of said sleeves, corresponding ears on said socket and sleeve having openings therethrough, bolts extending through the openings in said corresponding ears, and nuts on said bolts, said nuts being held against turning by the walls adjacent to said ears and said bolts being held against withdrawal by the sleeve which is interlocked with that to which said bolts are secured, substantially as described.

This specification signed and witnessed this 23d day of October, 1906.

EDWIN T. GREENFIELD.

Witnesses:
 S. O. EDMONDS,
 D. S. EDMONDS.